(12) United States Patent
Arnaut et al.

(10) Patent No.: US 6,720,022 B1
(45) Date of Patent: Apr. 13, 2004

(54) GRANULATED BREAD IMPROVER FOR THE PREPARATION OF BAKERY PRODUCTS

(75) Inventors: Filip R. Arnaut, Roosdaal (BE); Hans-Christian Janke, Lennestadt (DE)

(73) Assignee: Puratos Naamloze Vennootscap (BE)

( * ) Notice: Subject to any disclaimer, the term of this patent is extended or adjusted under 35 U.S.C. 154(b) by 0 days.

(21) Appl. No.: 09/623,013

(22) PCT Filed: Feb. 18, 1999

(86) PCT No.: PCT/BE99/00025

§ 371 (c)(1),
(2), (4) Date: Aug. 24, 2000

(87) PCT Pub. No.: WO99/43213

PCT Pub. Date: Sep. 2, 1999

(30) Foreign Application Priority Data

Feb. 26, 1998 (EP) .............................................. 98870039

(51) Int. Cl.[7] .................................................. A21D 8/04
(52) U.S. Cl. ...................................................... 426/653
(58) Field of Search ............................. 426/89, 33, 94, 426/98, 99, 549, 555, 554, 622, 20, 61, 63, 64, 653

(56) References Cited

U.S. PATENT DOCUMENTS

| | | | | |
|---|---|---|---|---|
| 3,527,647 A | | 9/1970 | Hager ........................... | 99/199 |
| 4,009,076 A | * | 2/1977 | Green et al. ................... | 195/63 |
| 5,391,371 A | * | 2/1995 | Jacobsen et al. ............ | 424/94.2 |
| 6,413,548 B1 | * | 7/2002 | Hamer et al. ................ | 424/489 |
| 6,500,463 B1 | * | 12/2002 | van Lengerich ............ | 424/499 |
| 6,534,018 B1 | * | 3/2003 | Baker et al. ................. | 422/128 |

FOREIGN PATENT DOCUMENTS

| | | | |
|---|---|---|---|
| EP | 0 619 079 | * | 12/1994 |
| EP | 0 650 669 A1 | | 5/1995 |
| EP | 0 659 344 A1 | | 6/1995 |
| FR | 2 711 486 | | 5/1995 |
| GB | 920261 | | 3/1963 |
| GB | 998016 | | 4/1963 |
| WO | 98-38869 | * | 9/1998 |

* cited by examiner

*Primary Examiner*—Keith Hendricks
(74) *Attorney, Agent, or Firm*—Knobbe, Martens, Olson & Bear, LLP

(57) ABSTRACT

The present invention is related to a bread improver in the form of a powder, characterized in that it is made of agglomerated particles having a mean particle size of at least 250 μm. The present invention is also related to the preparation method of said bread improver.

7 Claims, 4 Drawing Sheets

GRANULATED BREAD IMPROVER FOR THE PREPARATION OF BAKERY PRODUCTS

FIELD OF THE INVENTION

The present invention is related to a granulated bread improver for the preparation of bakery products, and to the bakery products comprising said improver.

The present invention is also related to the preparation process of said granulated bread improver.

BACKGROUND OF THE INVENTION

Baked bread products are made of the basic ingredients: flour (mostly wheat or rye flour), water, salt and yeast. Other types of flour (barley, oats, soy, sunflower, cassava and. other). The process of baking is subject to a lot of variations due to external (temperature, humidity, handling) and internal (variations of flour and yeast quality) factors.

To obtain a more reliable production process and a constant end product the baker uses ingredients and additives. These products are mostly added as one coformulated product and are known as improvers. These improvers may contain emulsifiers and fats, enzymes, sugars, organic acids, minerals, polysaccharides and proteins. This includes products such as diacetyltartaric acid esters of monoglycerides, lactic acid ester of monoglycerides, monoglycerides, amylases, hemicellulases and pentosanases, oxidases, lipases, proteinases, glucose, fructose, sucrose, ascorbic acid, lactic acid, phosphates, sulphates, guar, locust bean gum, gluten, soy proteins.

Said list is not exhaustive and is presented as an illustration of a possible improver. A mixture of ingredients active in the preparation process of baked goods is called an improver as soon as it contains more than one class of active components mixed together as to optimise by a synergetic effect their performances in the baking process. The mixing of several enzymes does not lead to obtain an improver. On the other hand, mixing one or more enzymes with an emulsifier (for example DATEM) or with ascorbic acid gives the formulation of an improver.

The improver can be formulated as a liquid, as a paste or more commonly as a powder. The powdered formulation contains the active ingredients as above-mentioned and a carrier substance. The carrier substance is added to the active ingredients in order to dilute them to the suitable concentration. The improver will be added by the baker in a concentration of 0.5 to 20% to the flour.

The most currently used carrier substances are starch, wheat flour or soy flour. The powdered formulation of the improver is very stable, and easy to weigh and to store.

However, said formulation presents also various drawbacks. If one of the components is an emulsifier or another fat-based product, the improver will tend to stick, which may result in more or less compact lumps.

This effect is more pronounced at higher temperatures. As a result of its poor free flowing characteristics, the improver is not easily carried by automatic dosing systems and tends to get stuck in the pipes. This also makes dosing inaccurate, and makes the cleaning of the pipes arduous. In addition, a flour which contains a lot of small particles may give rise to allergic reactions for sensitised persons, for instance as in baker's disease which is well known to be caused by allergenic wheat flour particles and by the powdered additives.

In various fields, it has been proposed to increase the particle size of various compositions.

The enzyme producers have granulated their enzymes to reduce this risk of allergenicity as illustrated in the U.S. Pat. No. 4,940,665.

The International Patent Application WO93/07260 describes the manufacturing of dust free particles of enzymes by spray-coating solid particulate cores.

The European Patent Application EP-A-0289069 describes also oil or fat obtained in a granular form.

The European Patent Application EP-A-0659344 describes a dry yeast composition consisting of dry inactive yeast and a bread improving agent which is preferably in a granular form or consists of small particles adhering larger yeast granules. This European Patent Application also describes a process to obtain a mixture of hemicellulase, amylase and Vitamin C in a granular form.

One might try to overcome the disadvantages of a powder form improver by applying the teaching of the European Patent Application EP-A-0659344 and thus producing or buying granulated ingredients or mixtures of ingredients. This however will result in a non-homogeneous particle distribution. In the specific applications described in the European Patent Application EP-A-0659344, said drawbacks are not important, because the end product is packed under reduced pressure afterwards, becomes a firm block and the particles are not able to move relative to one other. Mixing all improver ingredients in one solution and granulating as described in the European Patent Application EP-A-0659344 will only be efficient if all ingredients are miscible and stable in water. This is mostly not the case for bread improvers. This is illustrated by the fact that common emulsifiers as diacetyltartaric ester of monoglycerides or stearoyllactylates are readily hydrolysed in water and can not be used in aqueous solutions. It is also impossible to make aqueous solutions incorporating enzymes when at least one protease is to be present in the mixture.

SUMMARY OF THE INVENTION

The main aim of the invention is to provide a bread improver in the form of a powder and its preparation process which do not present the drawbacks of the above-mentioned state of the art.

The main aim of the invention is to provide a bread improver in the form of a powder and its preparation process, which presents improved free-flowing properties, which is more easy to handle and which may reduce the risk of potential allergenicity.

The present invention is related to a bread improver in the form of a powder which is made of agglomerated particles having a mean particle size of at least 250 $\mu$m. The mean agglomerated particle size of this product is preferably comprised between 300 and 2000 $\mu$m.

Preferably, the standard deviation/mean agglomerated particle size ratio is lower than 0.8, preferably lower than 0.65.

In a preferred embodiment of the present invention, the particles are made of at least 2 different active ingredients, advantageously balanced to obtain an effect in bakery products.

The improver according to the invention can further comprise one or more ingredients selected from the group consisting of emulsifiers, fats, enzymes, sugars, organic acids, minerals, polysaccharides, proteins and/or a mixture thereof.

A second aspect of the present invention is related to a method for obtaining the granulated improver in the form of a powder according to the invention, said method comprising the steps of:

preparing a starting material being a bread improver in the form of a dried powder having a mean particle size lower than 200 $\mu$m, introducing and maintaining said starting material in a fluidised bed reactor, under spraying of an atomised liquid, in order to obtain an agglomeration of the dried powder particles of said material, and recovering a bread improver in the form of a dried powder made of agglomerated particles having mean particle size of at least 250 μm.

In the method according to the invention, the standard deviation/mean agglomerated particle size ratio of the agglomerated particles is preferably lower than the standard deviation/mean agglomerated particle size ratio of said starting material.

In the method according to the invention, said liquid comprises water and preferably further comprises an agglomerating agent selected from the group consisting of polysaccharides (such as guar, alginate, carrageenan, pectin, maltodextrins) or proteins (such as gelatin) and/or a mixture thereof.

In the method according to the invention, the temperature of the fluidised bed reactor is preferably comprised between 20 and 45° C., more preferably between 25 and 40° C.

Advantageously, the fluidised bed reactor used in the method according to the invention is a Glatt granulating device. However, other fluidised bed equipments are also suitable for the preparation of the bread improver according to the invention. Examples are Allgaier Wirbelschichttrockner (Allgaier Uhingen, GERMANY) and Vector Fluid Bed (Vector Marion, Iowa, USA).

BRIEF DESCRIPTION OF THE DRAWINGS

The FIGS. of 1 to 4 represent the average size distribution of various improvers according to the invention compared to the powder formulation of the starting material.

DETAILED DESCRIPTION OF THE INVENTION

Figure 1:
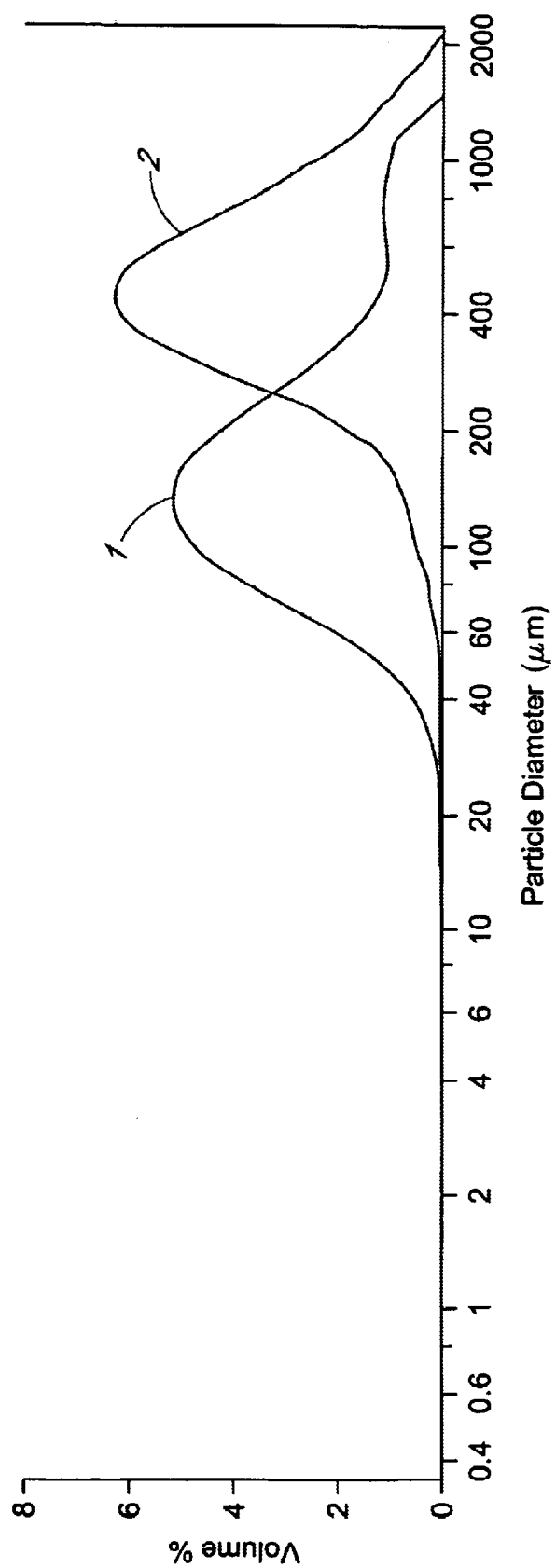

The granulation of a formulated improver is not obvious to perform. Due to its very complex composition, special care has to be taken to keep the activity of the different components intact. Specially sensitive active components are enzymes and emulsifiers. The temperature sensitivity of enzymes is commonly known. Emulsifiers are also temperature sensitive: they melt at a certain temperature, but even before this temperature is reached, an emulsifier tends to become sticky and will cause unwanted lumping in the improver. This means that the improver temperature during granulation must be kept under this melting temperature.

Moreover, emulsifiers are sensitive to moisture.

The dry improver may also contain other ingredients that are unstable in water or that tend to react with other ingredients present in the improver. As an illustration one can mention the reaction between bromate and cysteine. Therefore the moisture content must be kept low during the entire granulation process.

The granulation step is followed by measuring the particle size distribution by using the Coulter LS 200 Particle Analyser.

The bread improver powder is introduced in the granulating device. Warm air, preferably dried, is blown through the powder as to fluidise it. The air flow is such that a stable fluidised bed is obtained. This result is measured and determined by a person skilled in the art according to bed expansion and movement of the particles in said fluidised bed. The temperature of the fluidised bed has to be lower than 45° C. Preferably it is lower than 40° C. The lower limit is defined by the evaporative capacity of the air and is usually higher than 25° C. Once the fluidised bed is stabilised, water or preferably an aqueous solution containing an agglomerating material is sprayed on the fluidised bed. This step is usually called "topspray". It is also possible to granulate using the "bottom spray" method (also called the "Wurster process"). The aqueous solution, which preferably contains an agglomerating agent or a mixture of agglomerating agents dissolved in water, is sprayed on the bread improver powder. Examples of these agglomerating agents are: polysaccharides (such as guar, alginate, carrageenan, pectin, maltodextrins) or proteins (such as gelatin). The bread improver powder (possibly additionally dried) having the suitable mean particle size is then recovered from the granulating device.

The invention will be further illustrated in the following examples, in view of the enclosed figures, without limiting the scope of the present invention.

EXAMPLES

Example 1

Small Scale Granulation

The granulation was performed using a Glatt GPCG 1 (Glatt-Binzen-Germany).

The starting material is made of 1250 g of the product S500 Controller, available in Belgium from Puratos N.V. and is put in the granulation vessel. Some of the ingredient of S500 product are DATEM, enzymes, ascorbic acid, sugar and dry wheat flour.

A solution of 0.66% guar in water was used as the spraying solution at a spray rate of about 7.6 ml/min. The atomisation pressure in the nozzle was about 0.5 bar. Air inlet temperature was about 51° C. and the linear air speed about 3.5 m/s. Bed temperature was maintained at about 29° C. It fluctuated between about 26° C. and 32° C. Process time was about 75 minutes. In this period 3.8 g of guar was sprayed on the product.

In the FIG. 1, it is shown that the average particle size distribution is considerably increased by the granulation process. In all figures, (1) indicates the particle size distribution prior to the treatment, while (2) shows the particle size distribution after the agglomeration treatment according to the invention.

Example 2

Baking Experiments

Baking tests of Belgian pistolets were performed using the following method. The ingredients used in the four experiments as specified in Table 1 are all expressed in grams:

TABLE 1

Ingredients for baking tests 1 to 4

| Ingredients | Test 1 | Test 2 | Test 3 | Test 4 |
| --- | --- | --- | --- | --- |
| Wheat flour | 1500 | 1500 | 1500 | 1500 |
| Water | 930 | 930 | 930 | 930 |
| Yeast | 90 | 90 | 90 | 90 |
| Salt | 30 | 30 | 30 | 30 |
| Non-granulated S500 | 30 | | 45 | |
| S500 after granulation experiment 1 | | 30 | | 45 |

After mixing to optimum dough development (Diosna spiral mixer), the dough was allowed to rest for a total time of 25 minutes, then the dough was divided in 66 g dough pieces (Eberhardt divider) and allowed to rise for 15 minutes during which the dough pieces are cut. Final proofing takes 70 minutes and then the pistolets are baked at 230° C. for 20 minutes in a oven with steam (Miwe Condo).

After baking the specific volume is measured based on the rapeseed displacement method. The standard deviation on the baking experiment is about 0.2 liter/kg.

TABLE 2

Results for the example 2

|  | Test 1 | Test 2 | Test 3 | Test 4 |
|---|---|---|---|---|
| Specific volume (l/kg flour) | 12.9 | 12.8 | 14.1 | 14.0 |

Example 3

Small Scale Granulation

The granulation was performed using a Glatt GPCG 1 (Glatt-Binzen-Germany).

The starting material is made of 1250 g of the product Joker, available in Belgium and in Italy from Puratos N.V. and is put in the granulation vessel. Some of the ingredients of Joker product are: enzymes, ascorbic acid and dry wheat flour. It contains no emulsifier or fat. A solution of 25% maltodextrines (Maldex150-Amylum Belgium) in water was used as the spraying solution at a spray rate of about 4.4 ml/min. The atomisation pressure in the nozzle was about 1.5 bar. Air inlet temperature was about 51° C. and the linear air speed about 3.5 m/s. Bed temperature was maintained at about 29° C. It fluctuated between 26° C. and 32° C. Process time was about 150 minutes. In this period 165 g of maltodextrines was sprayed on the product.

Figure 2:
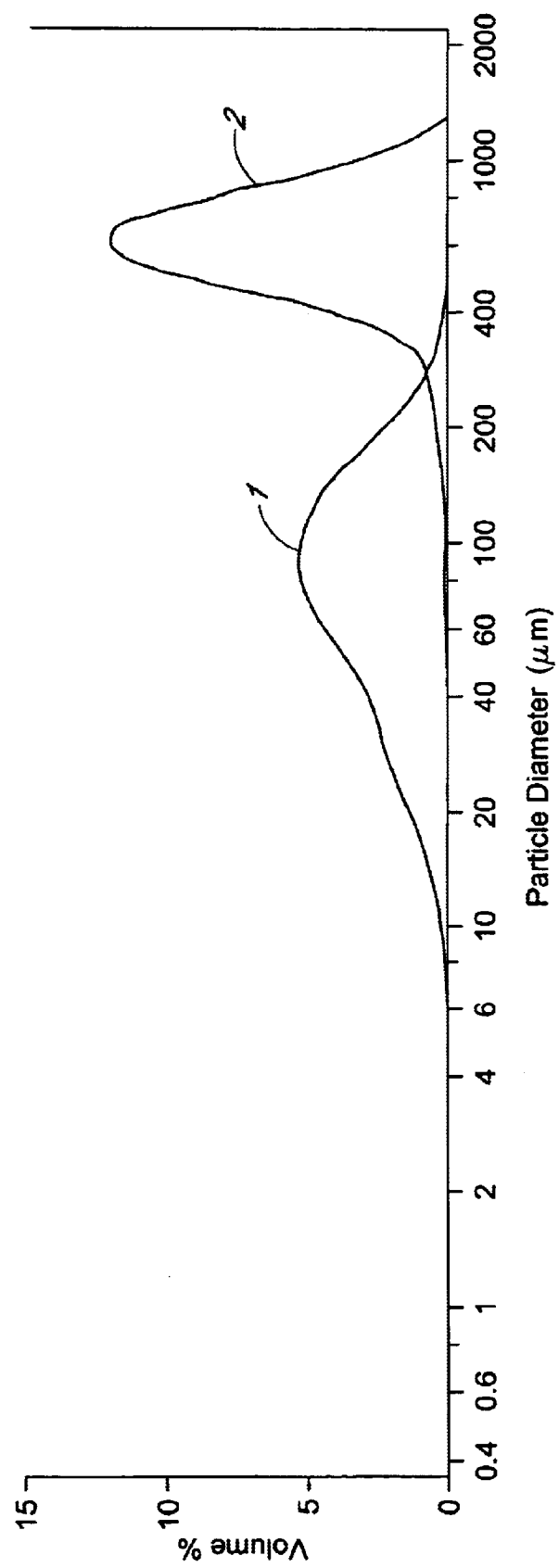

In the FIG. 2, it is shown that the average particle size distribution is considerably increased by the granulation process according to the invention.

Example 4

Industrial Granulation of Improver

The industrial granulator was a WSG 120-200 from Glatt-Binzen(Germany) equipped with 3 nozzles. The granulated product has the following composition:

| dextrose | 50 kg |
|---|---|
| DATEM in powder form | 25 kg |
| dry wheat flour | 117.5 kg |
| pre-diluted hemicellulase | 3.75 kg |
| pre-diluted alpha-amylase | 3.76 kg |

The enzymes were prediluted in wheat flour to facilitate a reproducible mixing. The ingredients were mixed and introduced in the granulation bowl. A solution of 0.66% guar in water was used as the spraying solution at a spray rate of about 25 l/h. The atomisation pressure in the nozzles was about 2 bar. Air inlet temperature varied between 20 and 75° C. The inlet air flow was about 3800 m³/h. Bed temperature was set at about 30° C. It fluctuated between 27° C. and 35° C. Process time was about 80 minutes. In this period, 0.5 kg of guar was sprayed on the product.

Figure 3:
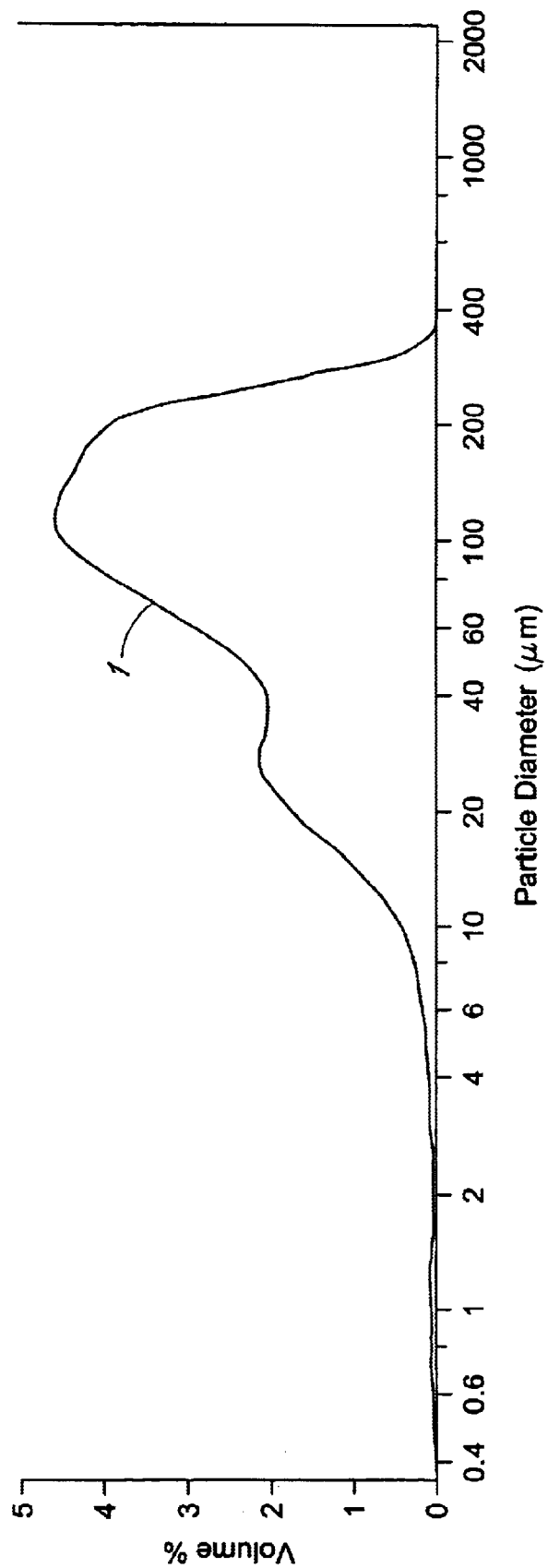
Figure 4:
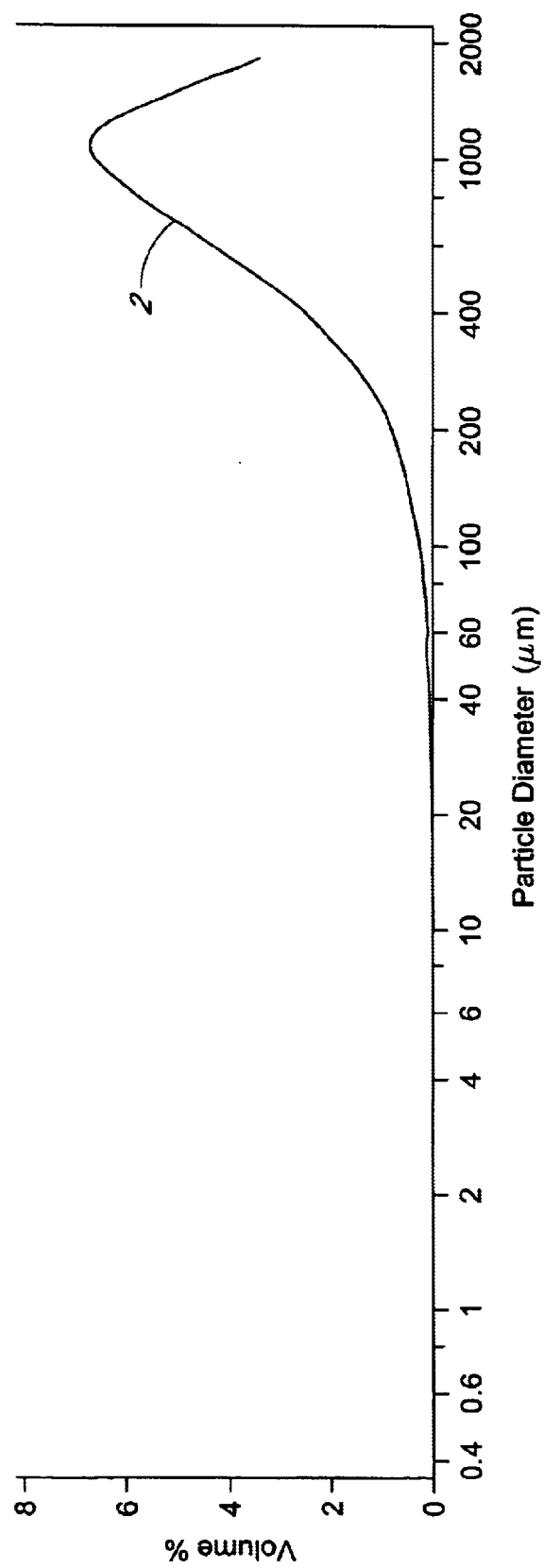

FIGS. 3 and 4 and Table 3 show that starting from a particle size distribution with at least 3 different populations, the product obtained after 80 minutes presents a uniform distribution, with an increased mean particle size.

Summary of Results

Results are expressed before and after granulation in the Table 3.

TABLE 3

Results for examples 1, 3 and 4

|  | Example 1 | | Example 3 | | Example 4 | |
|---|---|---|---|---|---|---|
|  | Before gran. | After gran. | Before gran. | After gran. | Before gran. | After gran. |
| Median (μm) | 151 | 454 | 79 | 608 | 88 | 851 |
| Mean (μm) | 238 | 531 | 92 | 617 | 100 | 890 |
| <250 μm (vol. %) | 74 | 17 | 98 | 4 | 97 | 13 |
| <50 μm (vol. %) | 3.9 | 0.5 | 30 | 0.4 | 31 | 0.7 |
| Standard deviatian (SD) | 245 | 326 | 64 | 200 | 72 | 466 |
| SD/mean | 1.03 | 0.61 | 0.70 | 0.32 | 0.72 | 0.52 |

The value of SD/mean is a measure for the uniformity of distribution. A more uniform particle size distribution has industrial advantages. In the table, it is clear that the granulation step decreases the value of SD/mean, which results in a more uniform distribution (steeper, more distinct peaks).

It is clear that the exact granulation parameters must be adapted to the exact composition and especially to the carrier substance. If gums or other agglomerating substances are already present in the dry improver mix, it can be sufficient to spray only water to granulate the powder as such.

What is claimed is:

1. A composition for preparing bread comprising:

a powder comprising agglomerated particles of fat and enzymes, said agglomerated particles having a mean particle size of at least 250 μm; and flour.

2. The composition of claim 1, wherein the particles further comprise proteins.

3. The composition of claim 1, wherein the mean particle size is between 300 and 2000 μm.

4. The composition of claim 1, wherein the ratio of the standard deviation/mean agglomerated particle size is less than 0.8.

5. The composition of claim 1, wherein the particles further comprise ingredients selected from the group consisting of: emulsifiers, sugars, organic acids, minerals, and a combination thereof.

6. The composition of claim 1, wherein the flour is selected from the group consisting of wheat flour and soy flour.

7. The composition of claim 1, wherein said fat is an emulsifier.

* * * * *